(12) United States Patent
Geise et al.

(10) Patent No.: US 7,297,174 B2
(45) Date of Patent: Nov. 20, 2007

(54) PARTICULATE FILTER ASSEMBLY

(75) Inventors: Charles J. Geise, Indianapolis, IN (US); William Taylor, III, Columbus, IN (US)

(73) Assignee: ET US Holdings, LLC, Wilmington, DE (US)

( * ) Notice: Subject to any disclaimer, the term of this patent is extended or adjusted under 35 U.S.C. 154(b) by 483 days.

(21) Appl. No.: 11/054,808

(22) Filed: Feb. 10, 2005

(65) Prior Publication Data

US 2005/0172588 A1    Aug. 11, 2005

Related U.S. Application Data

(60) Provisional application No. 60/543,782, filed on Feb. 11, 2004.

(51) Int. Cl.
  *B01D 39/00* (2006.01)
(52) U.S. Cl. .............. 55/490; 55/523; 55/DIG. 30
(58) Field of Classification Search ............ 55/490, 55/510, 523, DIG. 30
  See application file for complete search history.

(56) References Cited

U.S. PATENT DOCUMENTS

| | | |
|---|---|---|
| 3,945,803 A | 3/1976 | Musall |
| 4,270,936 A | 6/1981 | Mann |
| 4,276,066 A | 6/1981 | Bly et al. |
| 4,281,512 A | 8/1981 | Mills |
| 4,319,896 A | 3/1982 | Sweeney |
| 4,335,574 A | 6/1982 | Sato et al. |
| 4,362,700 A | 12/1982 | Hayashi |
| 4,373,330 A | 2/1983 | Stark |
| 4,381,643 A | 5/1983 | Stark |
| 4,381,767 A | 5/1983 | Finney |
| 4,520,624 A | 6/1985 | Kiyota et al. |
| 4,573,317 A | 3/1986 | Ludecke |
| 4,651,524 A | 3/1987 | Brighton |
| 4,730,455 A | 3/1988 | Pishinger et al. |
| 4,840,028 A | 6/1989 | Kusuda et al. |
| 4,848,083 A | 7/1989 | Goerlich |
| 4,851,015 A | 7/1989 | Wagner et al. |
| 5,024,054 A | 6/1991 | Barris et al. |
| 5,048,287 A | 9/1991 | Howe et al. |
| 5,063,737 A | 11/1991 | Lopez-Crevillen et al. |
| 5,065,574 A | 11/1991 | Bailey |
| 5,094,075 A | 3/1992 | Berendes |
| 5,140,814 A | 8/1992 | Kreutmair et al. |
| 5,211,009 A | 5/1993 | Houben et al. |
| 5,228,891 A | 7/1993 | Adiletta |
| 5,251,564 A | 10/1993 | Rim et al. |
| 5,365,733 A | 11/1994 | Takeshima et al. |
| 5,458,664 A | 10/1995 | Ishii et al. |
| 5,656,048 A | 8/1997 | Smith et al. |
| 5,934,069 A | 8/1999 | Hertl et al. |

(Continued)

FOREIGN PATENT DOCUMENTS

EP    1 382 442 A2    1/2004

(Continued)

*Primary Examiner*—Robert A. Hopkins
(74) *Attorney, Agent, or Firm*—Barnes & Thornburg LLP

(57) ABSTRACT

A particulate filter assembly comprises a tube, an end cap secured to the tube, a filter positioned in the tube, and a conductor. The conductor is configured to conduct filtered exhaust gas from the filter to an outlet defined in the end cap.

20 Claims, 8 Drawing Sheets

U.S. PATENT DOCUMENTS

| | | |
|---|---|---|
| 5,946,906 A | 9/1999 | Akazaki et al. |
| 6,012,284 A | 1/2000 | Tanaka et al. |
| 6,063,150 A | 5/2000 | Peter et al. |
| 6,182,445 B1 | 2/2001 | Yamazaki et al. |
| 6,233,926 B1 | 5/2001 | Bailey et al. |
| 6,321,533 B1 | 11/2001 | Watanabe et al. |
| 6,327,852 B1 | 12/2001 | Hirose |
| 6,344,306 B1 | 2/2002 | Fujiyoshi et al. |
| 6,422,006 B2 | 7/2002 | Ohmori et al. |
| 6,444,177 B1 | 9/2002 | Müller |
| 6,694,727 B1 | 2/2004 | Crawley et al. |
| 2002/0038536 A1 | 4/2002 | Best |

FOREIGN PATENT DOCUMENTS

| | | |
|---|---|---|
| GB | 2134 407 A | 8/1984 |
| JP | 06 269679 A | 9/1994 |
| JP | 2000 007455 | 1/2000 |
| JP | 2001 096111 | 4/2001 |
| WO | WO 2004/013469 A1 | 2/2004 |

PARTICULATE FILTER ASSEMBLY

This application claims the benefit under 35 U.S.C. § 119(e) of U.S. Provisional Application No. 60/543,782 which was filed Feb. 11, 2004 and is hereby incorporated by reference herein.

FIELD OF THE DISCLOSURE

The present disclosure relates generally to particulate filter assemblies.

BACKGROUND OF THE DISCLOSURE

Some internal combustion engines such as diesel engines produce particulate matter in its exhaust gas. A particulate filter assembly may be used to trap or otherwise filter such particulate matter to limit discharge of particulate matter into the atmosphere.

SUMMARY OF THE DISCLOSURE

According to a first aspect of the present disclosure, there is provided a particulate filter assembly. The assembly comprises a tube, an end cap secured to the tube and defining a first end cap outlet, a filter, and a conductor. The filter is positioned in the tube and configured to filter particulate matter present in exhaust gas. The filter comprises a generally planar first side face extending along an axis of the tube. The conductor mounts the filter in the tube and defines a first exhaust gas outlet passageway configured to conduct filtered exhaust gas from the first side face to the first end cap outlet.

According to another aspect of the present disclosure, the tube is shaped as a right circular cylinder and the filter comprises a substrate that is shaped as a rectangular parallelepiped and provides the first side face. The conductor is used to mount the substrate in the tube and to conduct filtered exhaust gas from the first side face to the first end cap outlet.

According to another aspect of the disclosure, the conductor comprises first and second conduits. The first conduit is secured to the filter and the end cap and defines the first exhaust gas outlet passageway. The second conduit is secured to the filter and the end cap and defines a second exhaust gas outlet passageway configured to conduct filtered exhaust gas from a second side face of the filter to a second end cap outlet defined in the end cap. The conduits are not secured to the tube in order to allow thermal expansion and contraction of the filter relative to the tube.

A variety of configurations for the filter is provided. In one example, the filter comprises a single rectangular parallelepiped substrate mounted in the tube by the first and second conduits. In another example, the filter comprises a pair of coaxial rectangular parallelepiped substrates secured to one another and mounted in the tube by the first and second conduits. In yet another example, the filter comprises a pair of rectangular parallelepiped substrates that is secured to third conduit positioned between the substrates and defines a third exhaust gas outlet passageway configured to conduct filtered exhaust gas from the substrates to a third end cap outlet defined in the end cap.

The above and other features of the present disclosure will become apparent from the following description and the attached drawings.

DETAILED DESCRIPTION OF THE DRAWINGS

Figure 1:
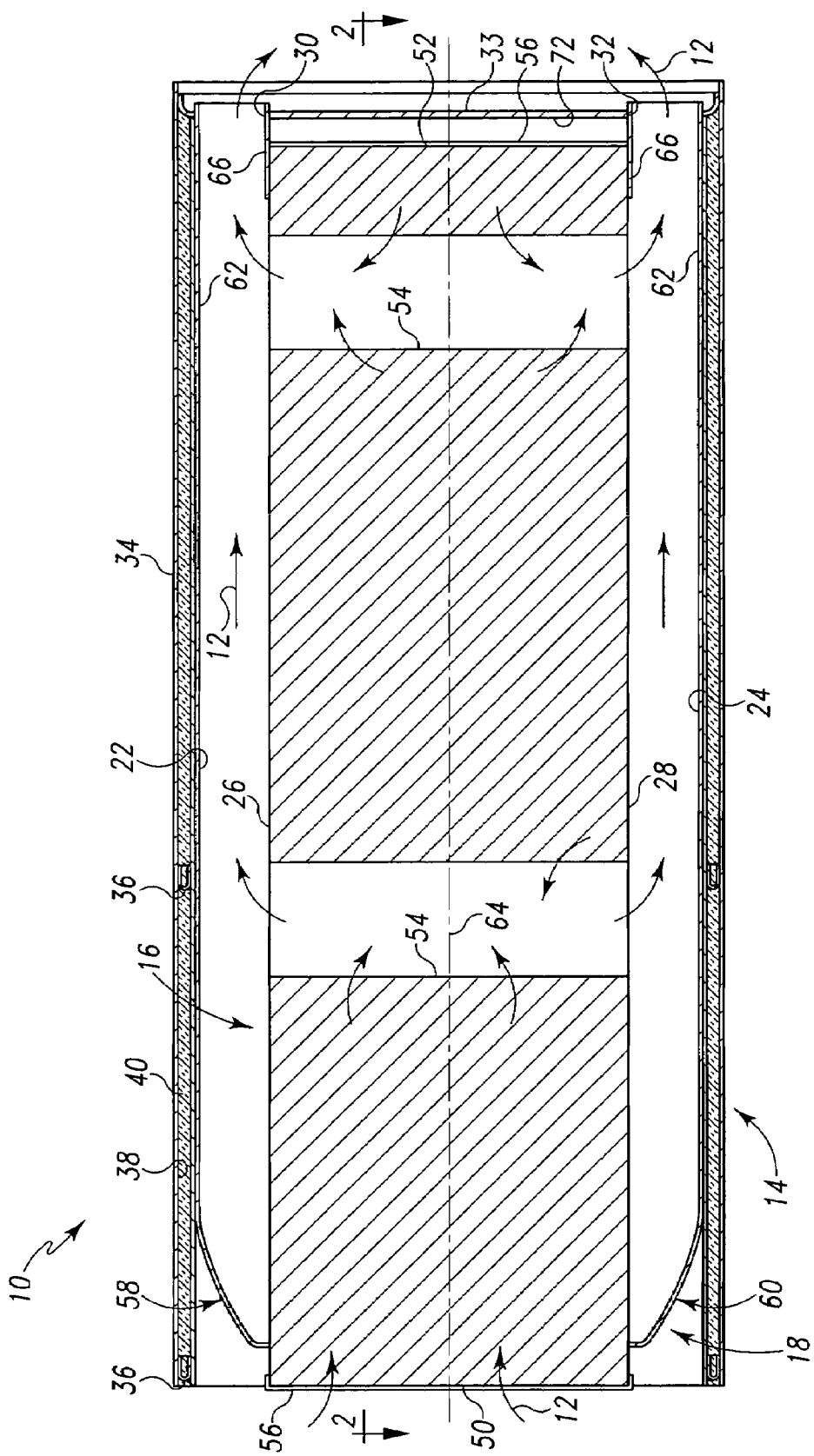
FIG. 1 is a longitudinal sectional view of a first particulate filter assembly showing a first filter comprising one substrate for filtering particulate matter present in exhaust gas and showing a pair of conduits mounting the first filter in the tube and defining exhaust gas outlet passageways.
Figure 2:
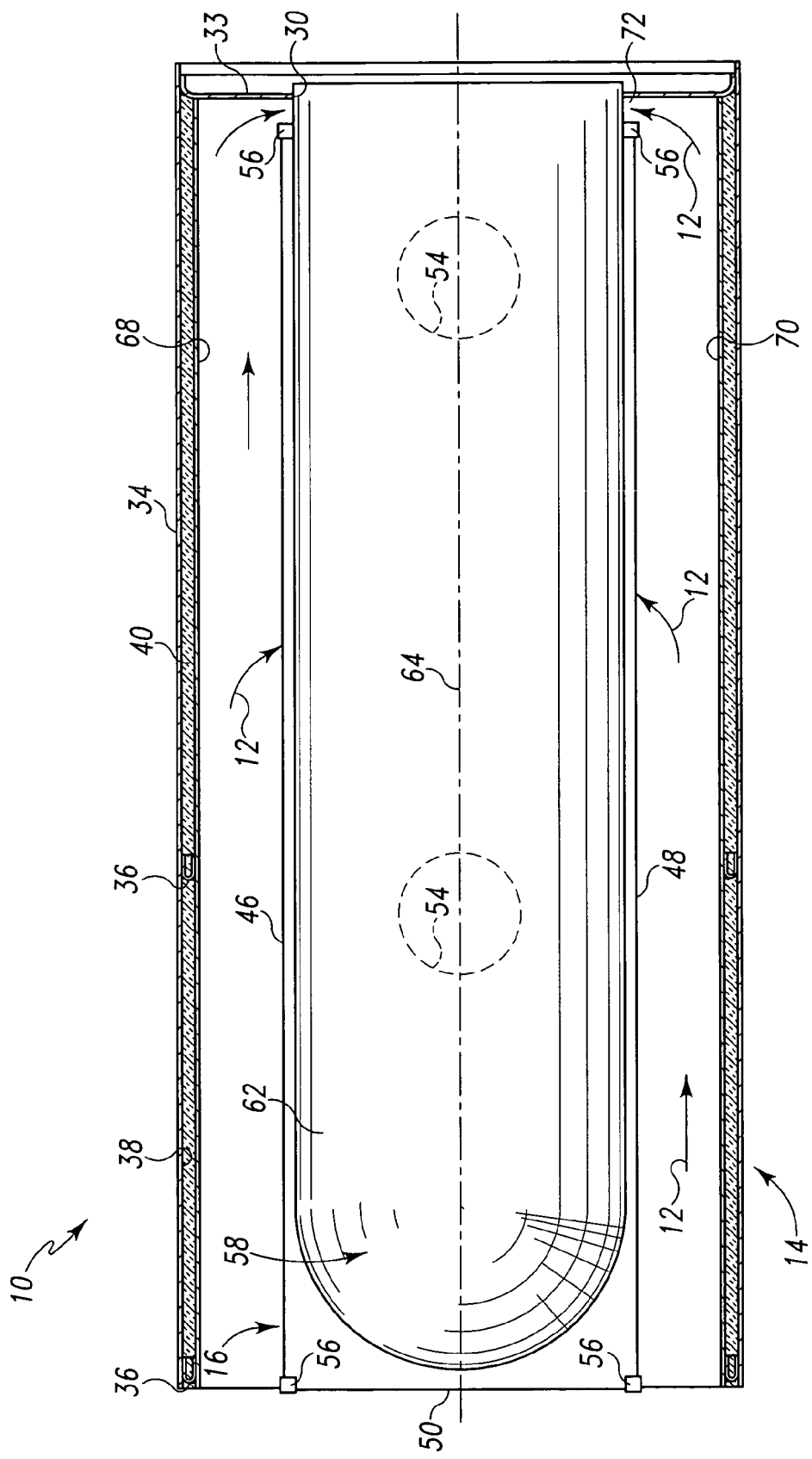
FIG. 2 is a longitudinal sectional view taken along lines 2-2 of FIG. 1.
Figure 3:
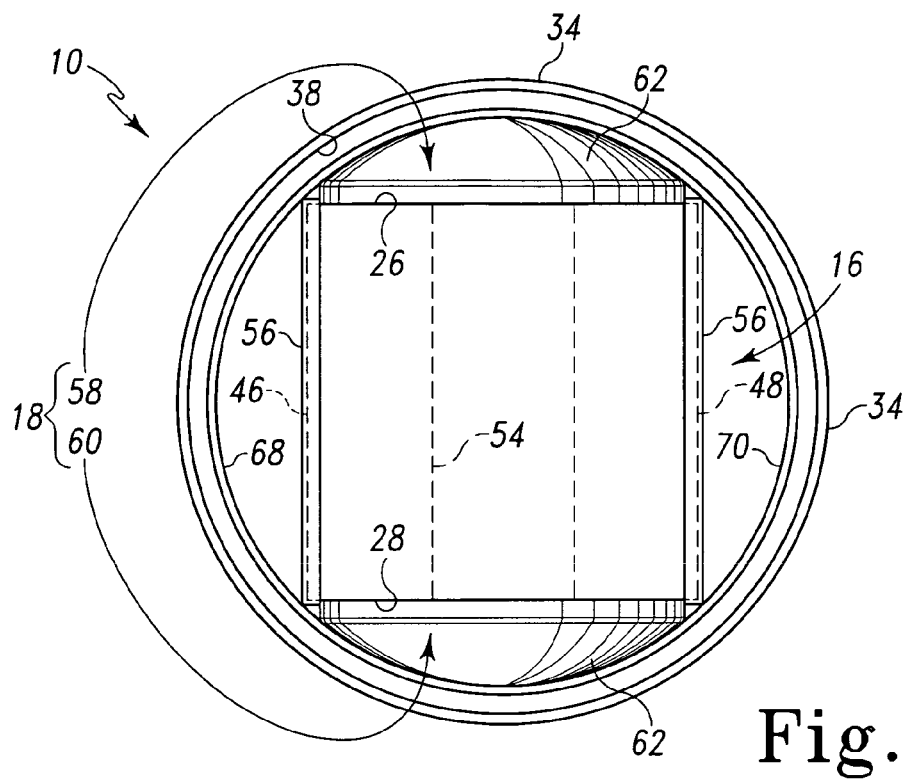
FIG. 3 is an inlet end elevational view of the first particulate filter assembly.
Figure 4:
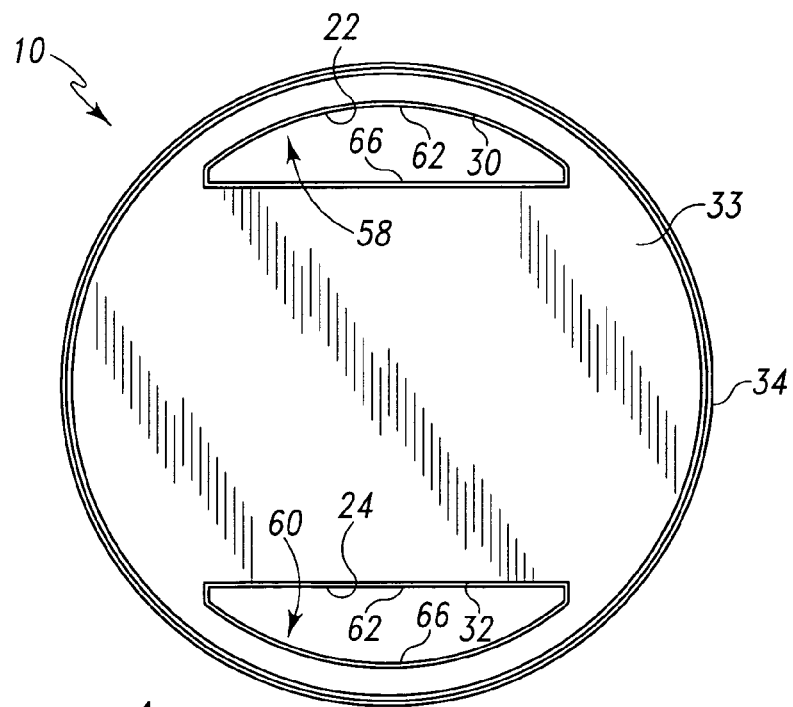
FIG. 4 is an outlet end elevational view of the first particulate filter assembly.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Referring to FIGS. 1-5, there is shown a first particulate filter assembly 10 for trapping or otherwise filtering particulate matter present in exhaust gas 12 discharged from an exhaust gas producer such as an internal combustion engine (e.g., diesel engine). The assembly 10 comprises a housing 14, a filter 16, and a conductor 18. The conductor 18 mounts the filter 16 in an inner tube 20 of the housing 14 and conducts filtered exhaust gas away from the filter 16 for discharge from the assembly 10.

Conductor 18 is useful with an arrangement in which the inner tube 20 is configured, for example, as a right circular cylinder and the filter 16 is configured, for example, as a rectangular parallelepiped made of sintered metal. The conductor 18 thus provides a mechanism for mounting a "rectangular" filter in a "round" tube.

The assembly 10 maximizes the flow area of exhaust gas 12 to minimize back pressure on the engine. In so doing, exhaust gas 12 is routed axially along an axis 64 of the assembly, into the filter 16, transversely relative to axis 64 to cause the exhaust gas 12 to exit the filter 16 through side faces 26, 28 of the filter 16, and then axially again through outlet passageways 22, 24 defined by the conductor 18 to end cap outlets 30, 32 formed in the end cap 33 to exit the assembly 10.

Further, the conductor 18 is secured to the filter 16 and the end cap 22 but not to the inner tube 20. Such an arrangement allows thermal expansion and contraction of the filter 16 relative to the inner tube 20.

The housing 14 comprises an outer tube 34 surrounding the inner tube 20. The outer tube 34 is secured to the end cap 33 and spaced apart from the inner tube 20 by use of annular spacers 36 to define therebetween an annular space 38 containing insulation 40. Similar to the inner tube 20, the outer tube 34 is configured, for example, as a right circular cylinder.

The filter 16 comprises a single substrate 44. The substrate is shaped as a rectangular parallelepiped having generally parallel and planar first and second side faces 26, 28, generally parallel and planar third and fourth side faces 46, 48, and generally parallel and planar first and second end faces 50, 52. Side faces 26, 28, 46, 48 connect end faces 50, 52. Each of third and fourth side faces 46, 48 and end faces 50, 52 act as a exhaust gas inlet faces to admit unfiltered exhaust gas into the substrate 44. First and second side faces 26, 28 act as exhaust gas outlet faces to discharge filtered exhaust gas from substrate 44.

A number (e.g., two) of internal substrate passageways are 54 defined in the substrate 44. The substrate passageways 54 connect first and second side faces 26, 28 so as to connect exhaust gas outlet passageways 22, 24 to conduct filtered exhaust discharged into substrate passageways 54 to exhaust gas outlet passageways 22, 24. Substrate passageways 54 have a diameter which is substantially larger than the pore size of the substrate 44.

Figure 5:
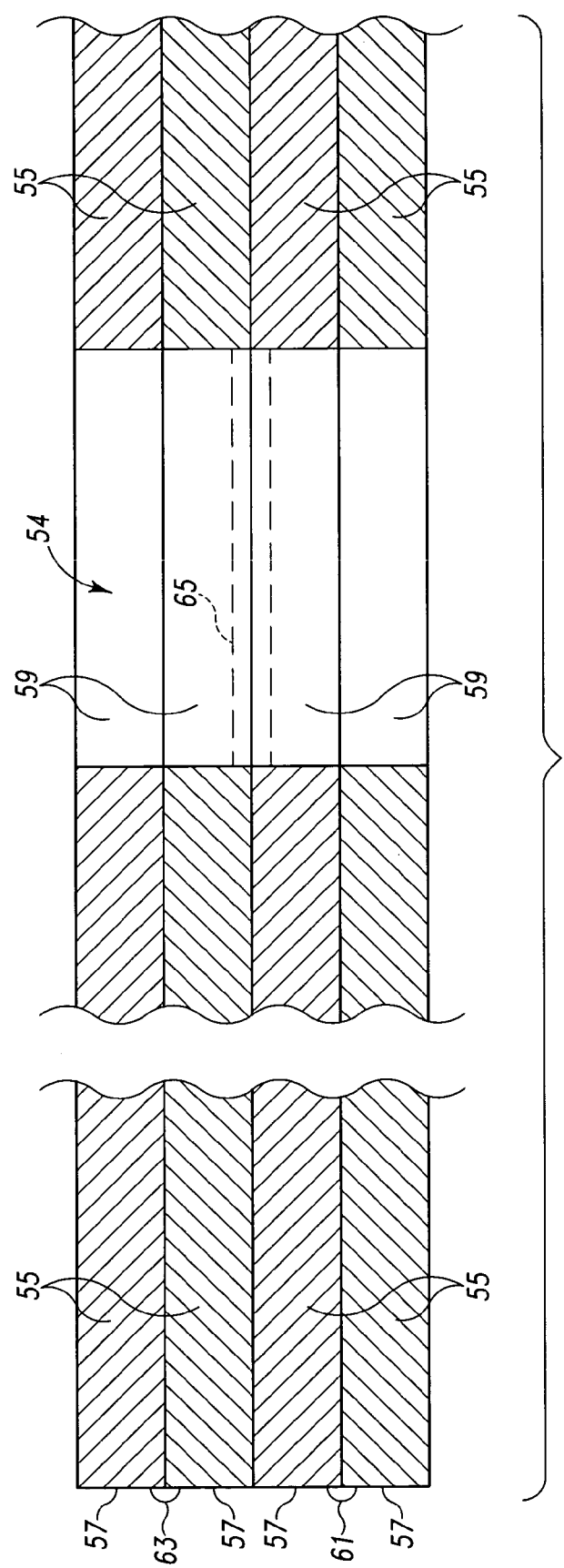
FIG. 5 is an enlarged fragmentary view showing sintered metal plates used in the construction of the substrate.

The substrate 44 is made of sintered metal. In particular, the substrate 44 comprises a plurality of rectangular sintered metal plates 55 (see FIG. 5 showing just four of the possibly many plates 55 of substrate 44) stacked one on top of the other between side faces 26 and 28. The rectangular parallelepiped shape of the substrate 44 results from stacking the rectangular sintered metal plates 55 one on top of the other. As such, the rectangular parallelepiped shape of substrate 44 thus facilitates use of the sintered metal plates 55 in the production of sintered metal substrate 44. A catalyst may be applied to the surfaces and the pores of the plates 55 to promote filtering of particulate matter.

Adjacent plates 55 may be secured to one another along the peripheries 57 of the plates 55 or around the internal apertures 59 defined in the plates 55 to form the substrate passageways 54. For example, a first pair of plates 55 may be secured to one another by a weldment 61 extending along their peripheries 57 and a next adjacent pair of plates 55 may be secured to one another by another weldment 63 extending along their peripheries 57. The two pairs of plates 55 may then be secured to one another by a weldment 65 extending along the internal apertures 59 of adjacent plates 55 of the two pairs of plates. The substrate 44 may have about 70 pairs of sintered metal plates 55.

A corner bracket 56 is secured to each of the four corners of the substrate 44. The four brackets 56 thus facilitate securement of the plates of the substrate 44 in place.

Conductor 18 comprises a first conduit 58 and a second conduit 60. The first conduit 58 defines the first exhaust gas outlet passageway 22 and the second conduit 60 defines the second exhaust gas outlet passageway 24. The first conduit 58 is secured to the first side face 26 and extends into the first end cap outlet 30 (e.g., an aperture) so as to be secured thereto. The second conduit 60 is secured to the second side face 28 and extends into the second end cap outlet 32 (e.g., an aperture) so as to be secured thereto. Conduits 58, 60 are not secured to inner tube 20 but have rounded plates 62 that mate against an inner surface of the inner tube 20 for slidable movement relative thereto to facilitate axial thermal expansion and contraction of the filter 16 relative to the inner tube 20 along an axis 64 of assembly 10 and tube 20 while at the same time mounting the filter 16 in the inner tube 20. Each rounded plate 62 is secured to the respective outlet 30, 32 and to a flat plate 66 of the respective conduit 58, 60. Each flat plate 66 is secured to the respective side face 26, 28 and respective outlet 30, 32.

During manufacture of the assembly 10, the conduits 58, 60 are secured to side faces 26, 28 and then secured to the end cap 33 at end cap outlets 30, 32. The inner tube is then slid over the conduits 58, 60 and secured at one end to the end cap 33 so that the conduits 58, 60 and the filter 16 are located in the inner tube. The outer tube 34, spacers 36, and insulation 40 are then assembled around the inner tube 20.

In use, exhaust gas 12 is advanced through the assembly 10 to be filtered by the filter 16. A portion of the exhaust gas 12 enters first end face 50 while the rest of the exhaust gas 12 enters exhaust gas side inlet passageways 68, 70. First exhaust gas side inlet passageway 68 is defined between third side face 46 and inner tube 20 and second exhaust gas side inlet passageway 70 is defined between fourth side face 48 and inner tube 20. Side inlet passageways 68, 70 conduct exhaust gas 12 to third and fourth side faces 46, 48 for entry therethrough into the substrate 44. Side inlet passageways 68, 70 conduct the exhaust gas 12 which does not enter substrate 44 through side faces 46, 48 to an exhaust gas end inlet passageway 72 defined between end cap 33 and second end face 52. End inlet passageway 72 conducts the remaining exhaust gas 12 to the second end face 52 for entry therethrough into the substrate 44.

Particulate matter present in the exhaust gas 12 is filtered out of the exhaust gas 12 as the exhaust gas 12 flows through the substrate 44. The thus-filtered exhaust gas 12 is discharged into the internal substrate passageways 54 which conduct the filtered exhaust gas 12 to the exhaust gas outlet passageways 22, 24. The outlet passageways 22, 24 then conduct the filtered exhaust gas 12 to the end cap outlets 30, 32 for discharge from the assembly 10.

Figure 6:
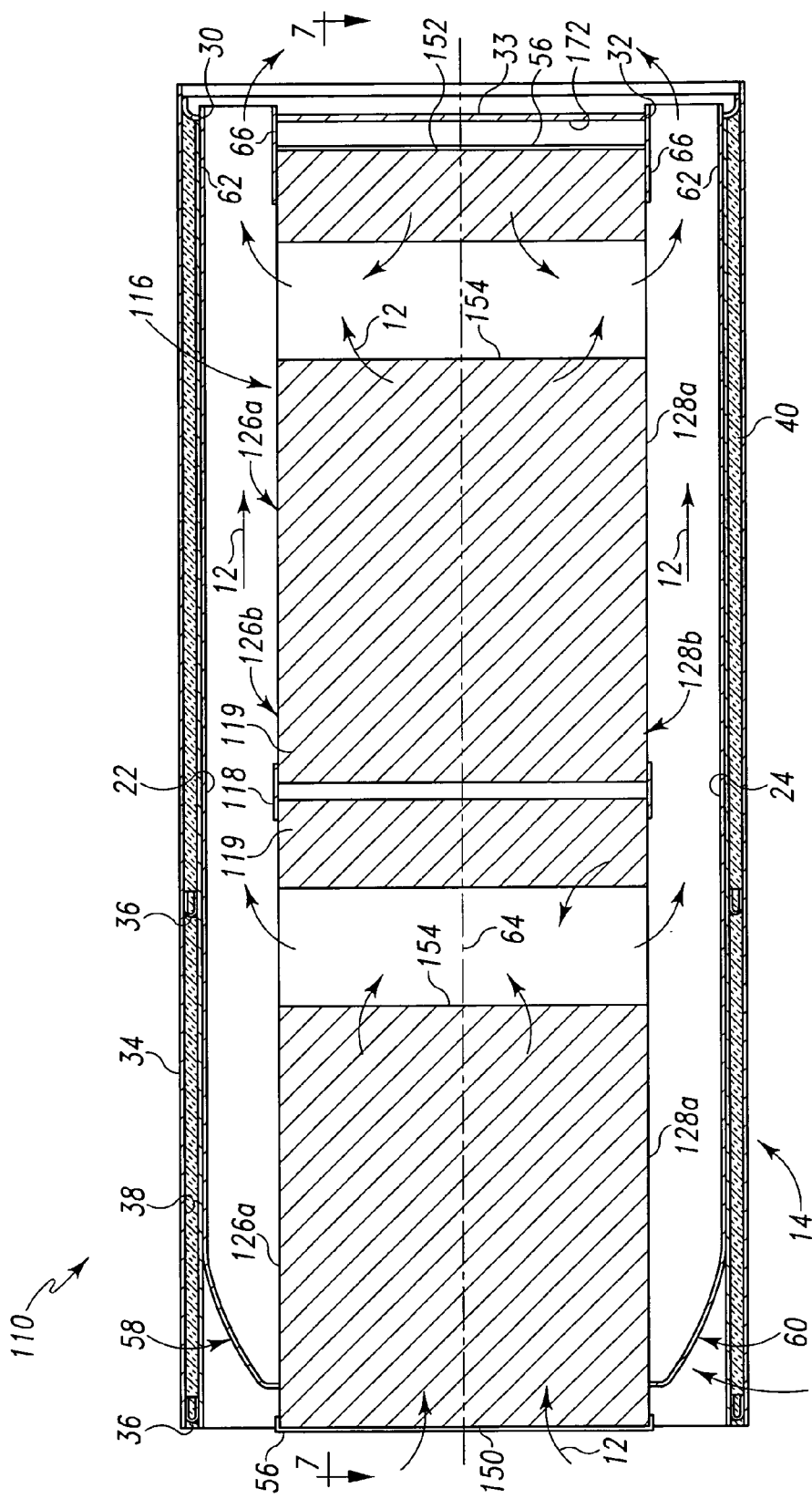
FIG. 6 is a longitudinal sectional view showing a second particulate filter assembly with a second filter comprising a pair of coaxial substrates.
Figure 7:
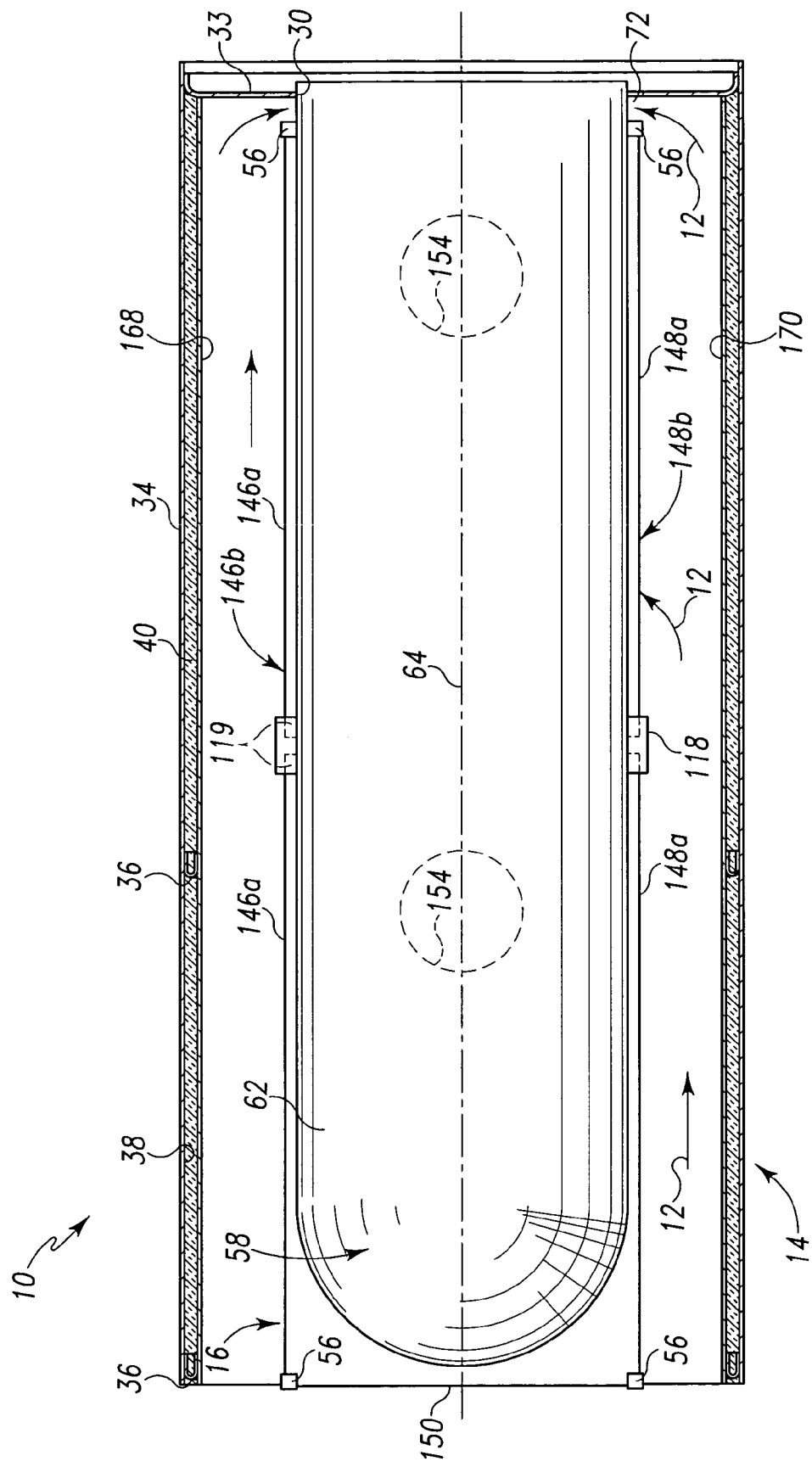
FIG. 7 is a longitudinal sectional view taken along lines 7-7 of FIG. 6.

Referring to FIGS. 6 and 7, a second particulate filter assembly 110 is similar in structure and function to the assembly 10 except that its filter 116 has two coaxial rectangular parallelepiped substrates 144 which are constructed in manner similar to substrate 44. A coupler 118 is secured to adjacent ends 119 of the substrates 144 so that the substrates 144 are coaxial relative to axis 64. The coupler 118 is configured, for example, as a band surrounding and secured to the ends 119.

The thus-coupled substrates 144 cooperate to provide the various faces of the filter 116. The first side faces 126a cooperate to provide a generally planar first side face 126b of the filter 116. The second side faces 128a cooperate to provide a generally planar second side face 128b of the filter 116. The third side faces 146a cooperate to provide a generally planar third side face 146b of the filter 116. The fourth side faces 148a cooperate to provide a generally planar fourth side face 148b of the filter 116. A first end face 150 of a first of the substrates 144 provides a first end face of the filter 116. A second end face 52 of a second of the substrates 144 provides a second end face of the filter 116. In such an arrangement, first and second side faces 126b, 128b are generally parallel, third and fourth side faces 146b, 148b are generally parallel, and end faces 150, 152 are generally parallel.

The substrates 144 cooperate with the inner tube 20 to provide the various inlet passageways therebetween. The inner tube 20 and the third side face 146b provided by the third side faces 146a cooperate to define therebetween a first exhaust gas side inlet passageway 168. The inner tube 20 and the fourth side face 148b provided by fourth side faces 148b cooperate to define therebetween a second exhaust gas side inlet passageway 170. The end cap 33 and the second end face 152 cooperate to define therebetween exhaust gas end inlet passageway 172.

During manufacture of the assembly 110, the conduits 58, 60 are secured to side faces 126b, 128b and then secured to the end cap 33 at end cap outlets 30, 32. The inner tube is then slid over the conduits 58, 60 and secured at one end to the end cap 33 so that the conduits 58, 60 and the filter 116 are located in the inner tube 20. The outer tube 34, spacers 36, and insulation 40 are then assembled around the inner tube 20.

In use, exhaust gas 12 is advanced through the assembly 110 to be filtered by the filter 116. A portion of the exhaust gas 12 enters first end face 150 while the rest of the exhaust gas 12 enters exhaust gas side inlet passageways 168, 170. Side inlet passageways 168, 170 conduct exhaust gas 12 to third and fourth side faces 146b, 148b for entry therethrough into the substrates 144. Side inlet passageways 168, 170 conduct the exhaust gas 12 which does not enter substrates 144 through side faces 146b, 148b to the exhaust gas end inlet passageway 172. End inlet passageway 172 conducts the remaining exhaust gas 12 to the second end face 152 for entry therethrough into a substrate 144.

Particulate matter present in the exhaust gas 12 is filtered out of the exhaust gas 12 as the exhaust gas 12 flows through the substrates 144. The thus-filtered exhaust gas 12 is discharged into internal substrate passageways 154 which are formed in substrates 144 and conduct the filtered exhaust gas 12 to the exhaust gas outlet passageways 22, 24. The outlet passageways 22, 24 then conduct the filtered exhaust gas 12 to the end cap outlets 30, 32 for discharge from the assembly 110.

Figure 8:
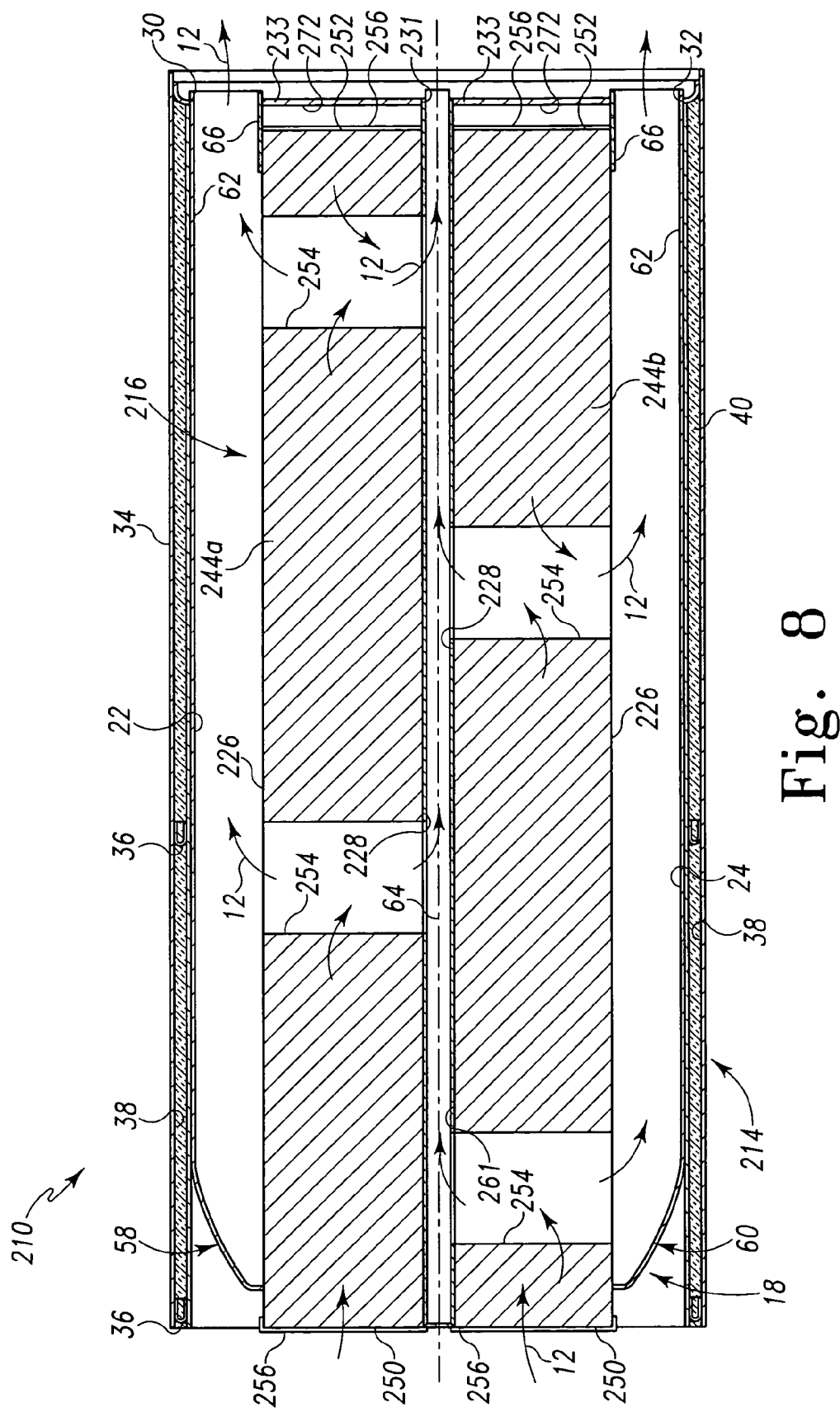
FIG. 8 is a longitudinal sectional view of a third particulate filter assembly comprising a third filter with a pair of substrates separated by a third conduit for receiving filtered exhaust gas therefrom.
Figure 9:
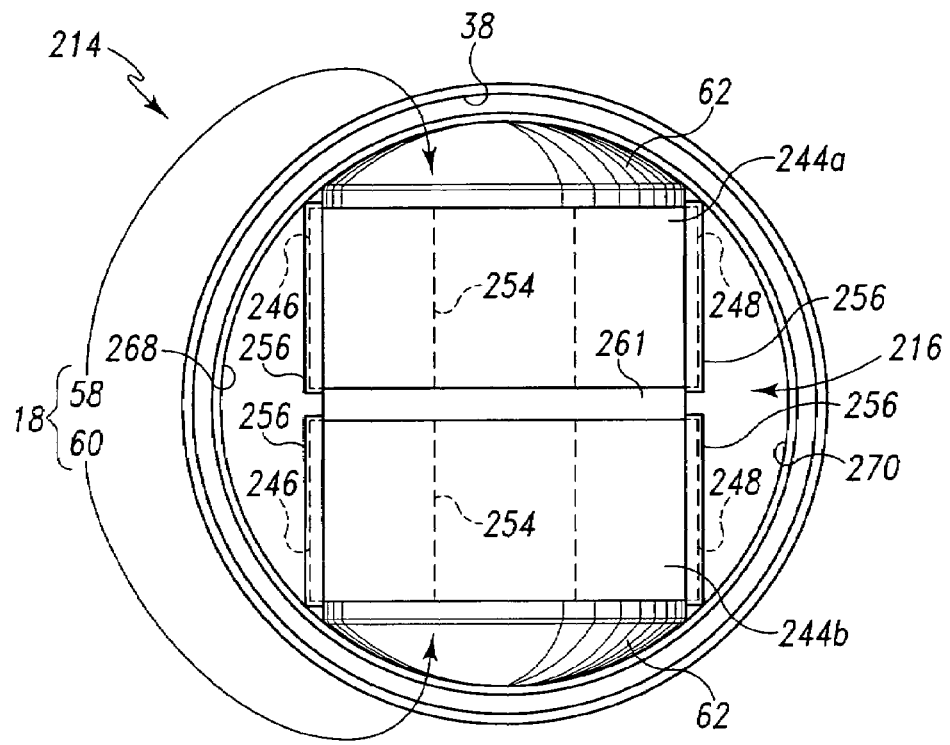
FIG. 9 is an inlet end elevational view of the third particulate filter assembly.
Figure 10:
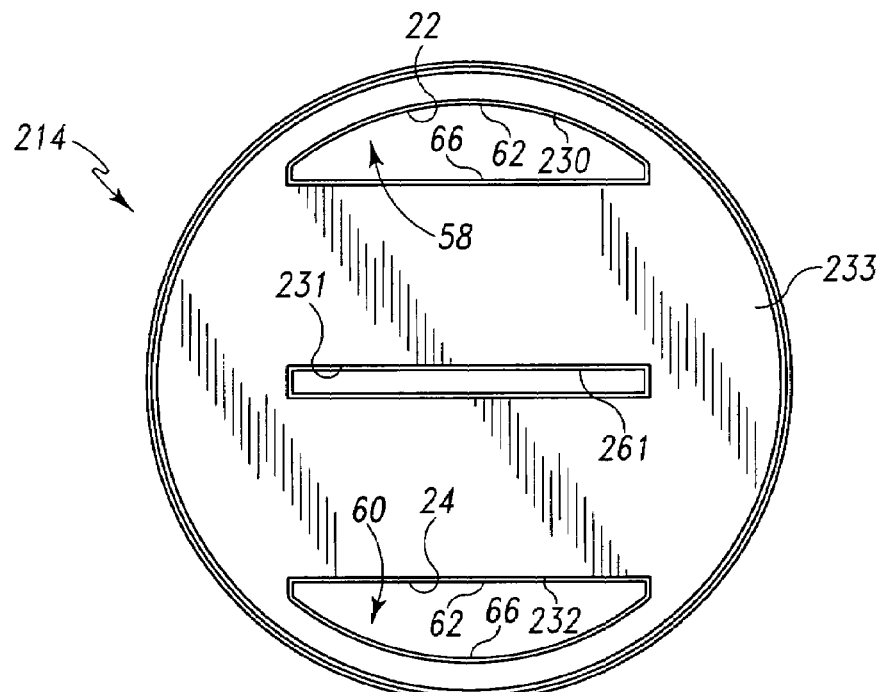
FIG. 10 is an outlet end elevational view of the third particulate filter assembly.

Referring now to FIGS. 8-10, a third particulate filter assembly 210 is similar in structure and function to the assemblies 10, 110 except that its filter 216 has two rectangular parallelepiped substrates 244a, 244b which are constructed in manner similar to substrate 44 and are spaced radially apart from one another by a generally rectangular third conduit 261. The third conduit 261 is positioned between the two substrates 244a, 244b and define a third exhaust gas outlet passageway 225 configured to conduct filtered exhaust gas 12 to a third end cap outlet 231 defined in an end cap 233. Such an arrangement further reduces engine back pressure.

Each substrate 244 includes a generally planar first, second, third, and fourth side faces 226, 228, 246, 248 and generally planar first and second end faces 250, 252. First and second faces 226, 228 of each substrate 244a, 244b are generally parallel to one another. Third and fourth faces 246, 248 of each substrate 244a, 244b are generally parallel to one another. First and second end faces 250, 252 of each substrates 244a, 244b are generally parallel to one another. The first conduit 58 is secured to the first side face 226 of substrate 244a to receive filtered exhaust gas 12 therefrom and the second conduit 60 is secured to the first side face 226 of substrate 244b to receive filtered exhaust gas therefrom. The third conduit is secured to the second side faces 228 of both substrates 244a, 244b to receive filtered exhaust gas therefrom.

Various exhaust gas inlet passageways are defined between the faces of the substrates 244a, 244b. A first exhaust gas side inlet passageway 268 is defined between inlet tube 20 and third side faces 246. A second exhaust gas side inlet passageway 270 is defined between inlet tube 20 and fourth side faces 248. A first exhaust gas end inlet passageway 272 is defined between end cap 233 and the second end face 252 of substrate 244a and between third conduit 261 and flat plate 66 of first conduit 58. A second exhaust gas end inlet passageway 273 is defined between end cap 233 and the second end face 252 of substrate 244b and between third conduit 26 and flat plate 66 of second conduit 60.

During manufacture of assembly 210, the conduits 58, 60 are secured to side faces 226 of the substrates 244a, 244a and then secured to the end cap 33 at end cap outlets 30, 32. The inner tube is then slid over the conduits 58, 60 and secured at one end to the end cap 33 so that the conduits 58, 60 and the filter 216 are located in the inner tube 20. The outer tube 34, spacers 36, and insulation 40 are then assembled around the inner tube 20.

In use, exhaust gas 12 is advanced through the assembly 210 to be filtered by the filter 216. A portion of the exhaust gas 12 enters first end faces 250 while the rest of the exhaust gas 12 enters exhaust gas side inlet passageways 268, 270. Side inlet passageways 268, 270 conduct exhaust gas 12 to third and fourth side faces 246, 248 of substrates 244a, 244b for entry therethrough into the substrates 244a, 244b. Side inlet passageways 268, 270 conduct the exhaust gas 12 which does not enter substrates 244a, 244b through side faces 246, 248 to exhaust gas end inlet passageways 272, 273. End inlet passageways 272, 273 conduct the remaining exhaust gas 12 to the second end faces 252 for entry therethrough into substrates 244a, 244b.

Particulate matter present in the exhaust gas 12 is filtered out of the exhaust gas 12 as the exhaust gas 12 flows through the substrates 244a, 244b. The thus-filtered exhaust gas 12 is discharged into internal substrate passageways 254 which are formed in substrates 244a, 244b and conduct the filtered exhaust gas 12 to the exhaust gas outlet passageways 22, 24, 225. The outlet passageways 22, 24, 225 then conduct the filtered exhaust gas 12 to the end cap outlets 230, 232, 231 for discharge from the assembly 210.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A particulate filter assembly, comprising:
    a tube,
    an end cap secured to the tube and defining a first end cap outlet,
    a filter positioned in the tube and configured to filter particulate matter present in exhaust gas, the filter comprising a generally planar first side face extending along an axis of the tube, and a conductor mounting the filter in the tube and defining a first exhaust gas outlet passageway configured to conduct filtered exhaust gas from the first side face to the first end cap outlet.

2. The assembly of claim 1, wherein:

the end cap defines a second end cap outlet, the filter comprises a generally planar second side face that extends along the axis of the tube and is parallel to the first side face, and the conductor defines a second exhaust gas outlet passageway configured to conduct filtered exhaust gas from the second side face to the second end cap outlet.

3. The assembly of claim 1, wherein the conductor includes a first conduit that is positioned between the tube and the first side face, defines the first exhaust gas outlet passageway, and is secured to the filter and the end cap but not to the tube to allow axial thermal expansion of the filter relative to the tube.

4. The assembly of claim 3, wherein:

the first conduit comprises a flat plate and a rounded plate, the first flat plate is secured to the filter and the end cap, the rounded plate is secured to the flat plate and the end cap and mates against the tube without being secured thereto.

5. The assembly of claim 3, wherein:

the end cap defines a second end cap outlet, the filter comprises a generally planar second side face that extends along the axis of the tube and is parallel to the first side face, and the conductor includes a second conduit that is positioned between the tube and the second side face, defines a second exhaust gas outlet passageway configured to conduct filtered exhaust gas from the second side face to the second end cap outlet, and is secured to the filter and the end cap but not to the tube to allow axial thermal expansion of the filter relative to the tube.

6. The assembly of claim 1, wherein:

the tube is shaped as a right circular cylinder, and the filter comprises a first sintered metal substrate that is shaped as a rectangular parallelepiped and at least partially provides the first side face.

7. The assembly of claim 6, wherein the first substrate is the only substrate of the filter.

8. The assembly of claim 6, wherein:

the filter comprises a second sintered metal substrate and a coupler, the second substrate is shaped as a rectangular parallelepiped and cooperates with the first substrate to provide the first side face of the filter, and the coupler is secured to the first and second substrates such that end faces of the first and second substrates face one another.

9. The assembly of claim 6, wherein:

the end cap defines a second end cap outlet and a third end cap outlet, the filter comprises a second sintered metal substrate that is shaped as a rectangular parallelepiped and provides the filter with a generally planar second side face that extends along the axis of the tube and is parallel to the first side face, the conductor includes a second conduit, a second conduit, and a third conduit, the first conduit is positioned between the tube and the first side face, is secured to the first substrate and the end cap but not to the tube, and defines the first exhaust gas outlet passageway, the second conduit is positioned between the tube and the second side face, is secured to the second substrate and the end cap but not to the tube, and defines a second exhaust gas outlet passageway configured to conduct filtered exhaust gas from the second side face to the second end cap outlet, and the third conduit is positioned between the first and second substrates and defines a third exhaust gas outlet passageway configured to conduct filtered exhaust gas from the first and second substrates to the third end cap outlet.

10. The assembly of claim 1, wherein:

the filter comprises generally planar first and second end faces between which the first side face extends, and each of the first and second end faces act as an exhaust gas inlet face.

11. A particulate filter assembly, comprising:

a tube shaped as a right circular cylinder, an end cap secured to the tube and defining first and second end cap outlets, a filter that is shaped as a rectangular parallelepiped and comprises first and second substrates configured to filter particulate matter present in exhaust gas, the first and second substrates positioned in the tube and coaxial with one another along an axis of the tube, the first substrate comprising a generally planar first end face of the filter, the second substrate comprising a generally planar second end face of the filter, the first and second substrates comprising generally planar first and second side faces of the filter, the first and second side faces connecting the first and second end faces, and first and second conduits, the first conduit positioned between the tube and the first side face, secured to the end cap and the filter, and defining a first exhaust gas outlet passageway configured to conduct filtered exhaust gas from the first side face to the first end cap outlet, the second conduit positioned between the tube and the second side face, secured to the end cap and the filter, and defining a second outlet passageway configured to conduct filtered exhaust gas from the second side face to the second end cap outlet.

12. The assembly of claim 11, wherein:

the first and second end faces are spaced apart from and parallel to one another, the first and second side faces are spaced apart from and parallel to one another, the first and second substrates cooperate to provide the filter with spaced-apart and parallel third and fourth side faces connecting the first and second end faces, and each of the first end face, the second end face, the third side face, and the fourth side face acts as an exhaust gas inlet face.

13. The assembly of claim 12, wherein:

the second end face cooperates with the end cap to define therebetween an exhaust gas end inlet passageway configured to conduct unfiltered exhaust gas to the second end face, the third side face cooperates with the tube to define therebetween a first exhaust gas side inlet passageway configured to conduct unfiltered exhaust gas to the third side face and the exhaust gas end inlet passageway, and the fourth side face cooperates with the tube to define therebetween a second exhaust gas side inlet passageway configured to conduct unfiltered exhaust gas to the fourth side face and the exhaust gas end inlet passageway.

14. The assembly of claim 11, wherein each of the first and second substrates defines an internal substrate passageway connecting the first and second side faces to conduct filtered exhaust gas from the respective substrate to the first and second exhaust gas outlet passageways.

15. The assembly of claim 11, wherein the filter includes a coupler securing ends of the first and second substrates to one another.

16. A particulate filter assembly, comprising:
a tube shaped as a right circular cylinder,
an end cap secured to the tube and defining first and second end cap outlets,
first and second substrates configured to filter particulate matter present in exhaust gas and positioned in flow-parallel to one another, each substrate positioned in the tube and shaped as a rectangular parallelepiped having generally planar first and second end faces and a generally planar first side face connecting the first and second end faces, and
first and second conduits, the first conduit positioned between the tube and the first side face of the first substrate, secured to the end cap and the first substrate, and defining a first exhaust gas outlet passageway configured to conduct filtered exhaust gas from the first side face of the first substrate to the first end cap outlet, the second conduit positioned between the tube and the first side face of the second substrate, secured to the end cap and the second substrate, and defining a second exhaust gas outlet passageway configured to conduct filtered exhaust gas from the first side face of the second substrate to the second end cap outlet.

17. The assembly of claim 16, wherein:
each of the first and second substrates comprises generally planar second, third, and fourth side faces, and
with respect to each of the first substrate and the second substrate, each of the second, third, and fourth side faces connects the first and second end faces, the first and second end faces are spaced apart from and parallel to one another, the first and second side faces are spaced apart from and parallel to one another, the third and fourth side faces are spaced apart from and parallel to one another, and each of the first end face, the second end face, the third side face, and the fourth side face provide an exhaust gas inlet face.

18. The assembly of claim 17, wherein:
the second end face of the first substrate cooperates with the end cap to define therebetween a first exhaust gas end inlet passageway configured to conduct unfiltered exhaust gas to the second end face of the first substrate,
the second end face of the second substrate cooperates with the end cap to define therebetween a second exhaust gas end inlet passageway configured to conduct unfiltered exhaust gas to the second end face of the second substrate,
the third side faces cooperate with the tube to define therebetween a first exhaust gas side inlet passageway configured to conduct unfiltered exhaust gas to the third side faces and the first and second exhaust gas end inlet passageways, and
the fourth side faces cooperate with the tube to define therebetween a second exhaust gas side inlet passageway configured to conduct unfiltered exhaust gas to the fourth side faces and the first and second exhaust gas end inlet passageways.

19. The assembly of claim 16, further comprising a third conduit, wherein:
the end cap defines a third end cap outlet,
the first substrate comprises a generally planar second side face spaced apart from and parallel to the first side face of the first substrate,
the second substrate comprises a generally planar second side face spaced apart from and parallel to the first side face of the second substrate, and
the third conduit is positioned between the second side faces, is secured to the end cap and the first and second substrates, and defines a third exhaust gas outlet passageway configured to conduct filtered exhaust gas from the second side faces to the third end cap outlet.

20. The assembly of claim 19, wherein:
the first substrate defines a first internal substrate passageway connecting the first and second side faces of the first substrate to conduct filtered exhaust gas from the first substrate to the first and third exhaust gas outlet passageways, and
the second substrate defines a second internal substrate passageway connecting the first and second side faces of the second substrate to conduct filtered exhaust gas from the second substrate to the second and third exhaust gas outlet passageways.

* * * * *